Patented Jan. 11, 1938

2,105,155

UNITED STATES PATENT OFFICE 2,105,155

NITROCELLULOSE EMULSIONS

Malcolm C. Moore, Newark, Del., assignor to Hercules Powder Company, Wilmington, Del., a corporation of Delaware No Drawing. Application February 7, 1935, Serial No. 5,405

18 Claims. (Cl. 134—79)

This invention relates to an improvement in nitrocellulose emulsions and more particularly to such emulsions wherein the nitrocellulose solution is pigmented.

Heretofore nitrocellulose emulsions of both the water-in-oil and the oil-in-water type have been known. However, where the nitrocellulose solution included in such emulsions, and more particularly in emulsions of the oil-in-water type, has contained a pigment, such emulsions have been of very low stability and hence of limited practical use.

In prior practice, it has been found, for example, that oil-in-water type emulsions of nitrocellulose solutions containing, for example, zinc oxide in sufficient quantity to give desired covering power, are of such low stability as to be of little practical value. Again, nitrocellulose emulsions, more particularly of the oil-in-water type, in which the nitrocellulose solution contains a pigment containing water-soluble substances which act as electrolytes, as, for example, Chinese blue, are of low stability and consequently of little practical value.

Heretofore, various efforts have been made to render emulsions of pigmented solutions of nitrocellulose stable. Thus, for example, in the case of pigments containing water-soluble substances which act as electrolytes, such substances have been removed from the pigment by extraction prior to addition of the pigment to the nitrocellulose solution and emulsification. In the case of pigments containing water-soluble substances which act as electrolytes, extraction of the pigment has proved substantially effective. However, extraction adds to the cost of the ultimate emulsions and is, to the extent of the added cost, disadvantageous. In the case of pigments such as zinc oxide, which are necessarily included in nitrocellulose solutions in relatively large quantity in order to obtain desired covering power, and which, it is believed, act to break the ultimate emulsions by physical action, no effective means has heretofore been known for avoiding lack of stability in the ultimate emulsions.

Now in accordance with this invention, it has been found that highly stable emulsions of solutions of nitrocellulose, more particularly of the oil-in-water type, wherein the nitrocellulose solutions contain a pigment or pigments having a tendency to break or render unstable the ultimate emulsion, either through the release to the aqueous phase of water-soluble substances acting as electrolytes or by physical action, can be produced.

Generally speaking, nitrocellulose emulsions in accordance with this invention comprise nitrocellulose in solution in a substantially water-immiscible solvent or solvent mixture and pigment having a tendency to break the emulsion emulsified with water through the medium of an emulsifying agent comprising a sodium salt of a half-ester sulphate of a higher aliphatic alcohol, as, for example, sodium lauryl sulphate, sodium stearyl sulphate, sodium cetyl sulphate, etc., or mixtures thereof, combined with methyl cellulose.

Emulsions in accordance with this invention will, generally speaking, be of the oil-in-water type. The nitrocellulose solution carrying a pigment having a tendency to break the emulsion, either through the release of water-soluble electrolyte or by physical action, may contain such other ingredients as may be necessary for the production of, for example, a coating composition, or as may be desired. The emulsifying agent comprising essentially a sodium salt of a half-ester sulphate of a higher aliphatic alcohol combined with methyl cellulose, but, if desired, may include additional ingredients or emulsifying agents.

Emulsions in accordance with this invention more specifically will desirably for best results, though not essentially, include solutions of nitrocellulose having a concentration of nitrocellulose within the range about 10% to 40%. The ratio of nitrocellulose solution to water in the ultimate emulsions will be desirably within the range about 2:1–4:1 by weight and the emulsifying agent will desirably be present in amount less than the amount of nitrocellulose in the emulsion. In any event, the methyl cellulose ingredient of the emulsifying agent will be in amount insufficient to deleteriously affect the integrity of the ultimate film formed by the nitrocellulose and, generally speaking, the amount of methyl cellulose will be less than the amount of sodium salt of a half-ester sulphate of a higher aliphatic alcohol included in the emulsifying agent.

In the preparation of emulsions in accordance with this invention any desired type of nitrocellulose may be used. The particular type of nitrocellulose chosen will depend upon the ultimate use of the emulsion. Generally speaking, nitrocelluloses of the type heretofore used in lacquers and enamels will be used. The nitrocellulose may have a wide range of viscosity, depending upon ultimate use of the emulsions. Thus, for example, the nitrocellulose may have a viscosity, on the basis of Hercules seconds, of one-quarter or one-half second or lower, or the nitrocellulose may be of relatively high viscosity, for example, 15–20 seconds, or even higher.

Any desired solvent or solvent mixture for the nitrocellulose may be used. Thus, for example, the solvent may comprise hexyl acetate, butyl acetate, octyl acetate, amyl propionate, amyl butyrate, methyl cyclohexanone, cyclohexanol acetate, butyl butyrate, butyl propionate, amyl acetate, or mixtures thereof. Again, various diluents may be included with the solvent, as, for example, xylol, butyl alcohol, amyl alcohol, etc., or mixtures thereof. The particular solvent or solvent mixture including a diluent or diluents which may be used in the case of any given emulsion will be dictated by the ultimate use for which the emulsion is intended, the type of surface to which it is to be applied, the conditions under which it is to be dried, etc. The nitrocellulose solution may contain various ingredients adapting it for the formation of, for example, a film or coating having desired characteristics. Thus, for example, the nitrocellulose solution may contain various ingredients generally used in the formation of lacquers or lacquer enamels, such, for example, as plasticizers, as triphenyl phosphate, tricresyl phosphate, etc., or mixtures thereof. The usual gums and resins, such as, for example, ester gum, dammar gum, terpinene maleic anhydride, glyptal type resins, etc., may be included. Where a plasticizer and/or a gum or resin is included in the nitrocellulose solution, such may be included in any desired proportion, dependent upon the characteristics desired for the film or coating to be ultimately produced with use of the emulsion.

The emulsifying agent, as has been indicated, will comprise essentially a sodium salt of a half-ester sulphate of a higher aliphatic alcohol, as, for example, sodium lauryl sulphate, sodium cetyl sulphate, sodium stearyl sulphate, etc. and methyl cellulose. The emulsifying agent may include additional emulsifying ingredients, as, for example, a soap, sulphonated castor oil, a naphthalene sulphonic acid derivative, or other emulsifying agent, which will be inert to the essential ingredients, i. e. methyl cellulose and sodium lauryl sulphate, and non-deleterious to the nitrocellulose.

The essential ingredients of the emulsifying agent, i. e. a sodium salt of a half-ester sulphate of a higher aliphatic alcohol and methyl cellulose, may be included in widely varying proportions. Generally speaking, the sodium salt of a half-ester sulphate of a higher aliphatic alcohol will be included in amount in excess of the amount of methyl cellulose. The amount of methyl cellulose generally will be maintained relatively low. The total amount of the emulsifying agent included in any particular emulsion will, generally speaking, be not in excess of that required for the production of an emulsion having desired stability.

Further, desirably, the methyl cellulose content of the emulsifying agent, whether the emulsifying agent consists of methyl cellulose and a sodium salt of a half-ester sulphate of a higher aliphatic alcohol alone, or whether it includes additional ingredients or emulsifying agents, will be kept low and desirably will not be in excess of about 0.65% by weight on the non-volatile or film-forming ingredients of the nitrocellulose solution in order that the integrity of the ultimate nitrocellulose film, and more particularly with respect to water resistance, will not be deleteriously affected. Preferably the amount of methyl cellulose will be less than 0.65% by weight of the non-volatile or film forming ingredients and an amount within the range about 0.3% to about 0.4% will usually be sufficient.

In emulsions in accordance with this invention, the sodium salt of a half-ester sulphate of a higher aliphatic alcohol ingredient of the emulsifying agent will desirably, though not essentially, be free from water-soluble constituents. Thus, where commercial sodium salts are used, they will desirably be extracted with methanol, for example, in a Soxhlet extractor for the removal of water-soluble constituents or impurities, as sodium sulphate, prior to use.

In emulsions in accordance with this invention, as has been indicated, pigments characterized by a tendency to break emulsions of the character contemplated will be included in the nitrocellulose solution phase of the emulsion. Thus, for example, the nitrocellulose solution phase may contain pigments having a tendency to break emulsions of the character contemplated by physical action, such as zinc oxide. Again, pigments having a tendency to break emulsions of the character contemplated through release of water-soluble electrolytes, such as Chinese blue, may be included. Again, the stability of emulsions comprising nitrocellulose solutions pigmented with carbon black, and which are readily produced, is very largely increased by virtue of this invention.

As illustrative of practical embodiment of this invention, for example, an emulsion in accordance therewith wherein a high percentage of zinc oxide is contained in the nitrocellulose solution, may be produced using a nitrocellulose solution made up on the following formula:

*Formula No. 1*

| | Per cent |
|---|---|
| Nitrocellulose (viscosity ½" Hercules) | 18 |
| Dammar gum | 5.4 |
| Castor oil | 6.0 |
| Dibutyl phthalate | 3.0 |
| Zinc oxide | 18.0 |
| Butanol (of which 7.6% is carried by the nitrocellulose) | 8.8 |
| Ethyl alcohol | 3.6 |
| Hiflash solvent naphtha | 10.6 |
| Toluol | 1.8 |
| Octyl acetate | 12.4 |
| Sec. hexyl acetate | 12.4 |
| | 100.0 |

The nitrocellulose solution made up on the above formula, and which, it will be noted, contains 18% of zinc oxide, is emulsified with distilled water containing in solution 0.4% methyl cellulose and 0.5% sodium lauryl sulphate on the ratio of two parts nitrocellulose solution to one part distilled water. The sodium lauryl sulphate will desirably be pure, that is to say, free from water-soluble impurities. The emulsification may be effected in any convenient or desired manner, as, for example, by mixing the nitrocellulose solution and water and passing the mixture through a homogenizer.

Again, the nitrocellulose solution made up on the above formula may be emulsified in water on the ratio of two parts of nitrocellulose solution to one part of distilled water, the water containing in solution 0.2%–0.35% methyl cellulose, 0.5% sodium lauryl sulphate free from water-soluble impurities and 1% sulphonated castor oil (75% grade).

The above emulsions embodying this invention will be of the oil-in-water type and will have high stability despite the high percentage of zinc oxide contained in suspension in the nitrocellulose solution phase. In distinction, emulsions as heretofore known, wherein the nitrocellulose solution phase contained zinc oxide in any substantial amount, much less in the amount contained in the above emulsions, would have such low stability as to render them substantially impractical for commercial use.

As further illustrative of the practical adaptation of this invention, for example, a nitrocellulose emulsion containing in the nitrocellulose solution phase a high percentage of a pigment comprising Chinese blue and titanium dioxide, may be made up on the following formula:

*Formula No. 2*

| | Per cent |
|---|---|
| Nitrocellulose (viscosity ½" Hercules) | 18 |
| Dammar gum | 5.4 |
| Plasticizer (2 parts castor oil, 1 part lindol) | 9.0 |
| Blue (32 parts Chinese blue, 3 parts titanium dioxide) pigment | 7.0 |
| Ethyl alcohol | 3.6 |
| Butanol (of which 7.6% is carried by the nitrocellulose) | 11.55 |
| Toluol | 1.8 |
| Hiflash naphtha | 13.35 |
| Sec. hexyl acetate | 15.15 |
| Octyl acetate | 15.15 |
| | 100.00 |

The nitrocellulose solution in accordance with the above formula is emulsified with water on the ratio of 2 parts of nitrocellulose solution to 1 part of distilled water, the distilled water containing in solution 0.4% methyl cellulose and 0.5% purified sodium lauryl sulphate. Again, the nitrocellulose solution on the above formula and containing a relatively high percentage of Chinese blue may be emulsified on the ratio of two parts of nitrocellulose solution to one part of distilled water containing 0.35% methyl cellulose, 0.5% purified sodium lauryl sulphate, and 1.0% sulphonated castor oil.

The emulsification may be carried out as indicated above or in any suitable manner. The emulsion will be of the oil-in-water type and will have a high degree of stability.

In comparison, an emulsion formed with use of a nitrocellulose solution made up on the above formula and containing Chinese blue, where sodium lauryl sulphate, methyl cellulose and sulphonated castor oil, as indicated, are used as the emulsifying agent, will retain its stability over a period in excess of two months, while an emulsion made up with the same nitrocellulose solution, with the blue pigment reduced from 7% to 4% and with use of an emulsifying agent comprising 0.5% purified sodium lauryl sulphate and 1.0% sulphonated castor oil, but without the inclusion of any methyl cellulose, will only remain stable for about two weeks.

As further illustrative, for example, a nitrocellulose emulsion pigmented with carbon black may be made up on the following formula:

| | Per cent |
|---|---|
| Nitrocellulose (viscosity ½" Hercules) | 20.0 |
| Dammar gum | 5.4 |
| Dibutyl phthalate | 3.0 |
| Tricresyl phosphate | 2.6 |
| Blown castor oil | 5.4 |
| Carbon black | 2.0 |
| Octyl acetate | 13.9 |
| Sec.-hexyl acetate | 13.9 |
| Butyl alcohol (of which 8.6% is carried by the nitrocellulose) | 14.0 |
| Hi-flash solvent naphtha | 13.8 |
| Toluol | 2.0 |
| Ethyl alcohol | 4.0 |
| | 100.0 |

Two hundred parts of the above lacquer phase are emulsified with 80 parts distilled water containing 0.30% methyl cellulose, 0.5% purified sodium lauryl sulphate, and 1.0% sulphonated castor oil (75% grade) using a colloid mill or homogenizer. The resultant emulsion will display a very high stability or resistance to breaking.

It will now be appreciated that this invention contemplates an emulsion of a solution of nitrocellulose emulsified through the medium of an emulsifying agent comprising a sodium salt of a half-ester sulphate of a higher aliphatic alcohol and methyl cellulose. More particularly, this invention contemplates a nitrocellulose emulsion including a pigment having a tendency to break the emulsion and, still more particularly, a nitrocellulose emulsion containing zinc oxide.

It will be understood that it is not contemplated that this invention shall be limited to the use of any particular type of nitrocellulose, solvent or solvent mixture, or other ingredients, nor to any particular concentration of nitrocellulose, or to any particular ratio of nitrocellulose solution to water, or to other details involved in the above description and examples of adaptation of this invention to practice. It will be understood that while the use of a combination of methyl cellulose and a sodium salt of a half-ester sulphate of a higher aliphatic alcohol as the emulsifying agent in emulsions in accordance with this invention is contemplated as essential, the use of an emulsifying agent or agents in addition to a sodium salt or salts of the class indicated and methyl cellulose is not excluded.

What I claim and desire to protect by Letters Patent is:

1. A nitrocellulose emulsion comprising a substantially water-immiscible solution of nitrocellulose emulsified with water through the medium of an emulsifying agent comprising methyl cellulose and a sodium salt of a half-ester sulphate of a higher aliphatic alcohol, the methyl cellulose being in amount not in excess of about 0.65% by weight of the non-volatile ingredients of the nitrocellulose solution and not less than an amount sufficient to have appreciable emulsifying action.

2. A nitrocellulose emulsion comprising a substantially water-immiscible solution of nitrocellulose emulsified with water through the medium of an emulsifying agent comprising methyl cellulose and a sodium salt of a half-ester sulphate of a higher aliphatic alcohol, the methyl cellulose being in amount of about 0.3% to about 0.4% by weight of the non-volatile ingredients of the nitrocellulose solution.

3. A nitrocellulose emulsion comprising a substantially water-immiscible solution of nitrocellulose emulsified with water through the medium of an emulsifying agent comprising methyl cellulose and sodium lauryl sulphate, the methyl cellulose being in amount not in excess of about 0.65% by weight of the non-volatile ingredients of the nitrocellulose solution and not less than an amount sufficient to have appreciable emulsifying action.

4. A nitrocellulose emulsion comprising a substantially water-immiscible solution of nitrocellulose containing a pigment having a tendency to break the emulsion emulsified with water through the medium of an emulsifying agent comprising methyl cellulose and a sodium salt of a half-ester sulphate of a higher aliphatic alcohol, the methyl cellulose being in amount not in excess of about 0.65% by weight of the nonvolatile ingredients of the nitrocellulose solution and not less than an amount sufficient to have appreciable emulsifying action.

5. A nitrocellulose emulsion comprising a substantially water-immiscible solution of nitrocellulose, having a concentration of nitrocellulose within the range 10%–40%, emulsified in disperse phase in water containing methyl cellulose and a sodium salt of a half-ester sulphate of a higher aliphatic alcohol in solution, the ratio of nitrocellulose solution to water ranging between about 2:1 to 4:1 by weight, and the methyl cellulose being in amount insufficient to deleteriously affect the water-resistance of the nitrocellulose film produced on drying of the emulsion and not less than an amount sufficient to have appreciable emulsifying action.

6. A nitrocellulose emulsion comprising a substantially water-immiscible solution of nitrocellulose, having a concentration of nitrocellulose within the range 10%–40%, a pigment tending to break the emulsion, emulsified in disperse phase in water containing methyl cellulose and a sodium salt of a half-ester sulphate of a higher aliphatic alcohol in solution, the ratio of nitrocellulose solution to water ranging between about 2:1 to 4:1 by weight and the methyl cellulose being in amount insufficient to deleteriously affect the water-resistance of the nitrocellulose film produced on drying of the emulsion and not less than an amount sufficient to have appreciable emulsifying action.

7. A nitrocellulose emulsion comprising a substantially water-immiscible solution of nitrocellulose emulsified with water through the medium of an emulsifying agent comprising methyl cellulose and a sodium salt of a half-ester sulphate of a higher aliphatic alcohol, the methyl cellulose being in an amount which is sufficient to have substantial emulsifying action but less than that which is sufficient deleteriously to affect the water resistance of the nitrocellulose film produced on breaking and drying of the emulsion.

8. A nitrocellulose emulsion comprising a substantially water-immiscible solution of nitrocellulose emulsified with water through the medium of an emulsifying agent comprising methyl cellulose and sodium lauryl sulphate, the methyl cellulose being in an amount which is sufficient to have substantial emulsifying action but less than that which is sufficient deleteriously to affect the water resistance of the nitrocellulose film produced on breaking and drying of the emulsion.

9. A nitrocellulose emulsion comprising a substantially water-immiscible solution of nitrocellulose emulsified in disperse phase in water containing methyl cellulose and sodium lauryl sulphate in solution, the methyl cellulose being in an amount which is sufficient to have substantial emulsifying action but less than that which is sufficient deleteriously to affect the water resistance of the nitrocellulose film produced on breaking and drying of the emulsion.

10. A nitrocellulose emulsion comprising a substantially water-immiscible solution of nitrocellulose containing a pigment having a tendency to break the emulsion emulsified with water through the medium of an emulsifying agent comprising methyl cellulose and a sodium salt of a half-ester sulphate of a higher aliphatic alcohol, the methyl cellulose being in an amount which is sufficient to have substantial emulsifying action but less than that which is sufficient deleteriously to affect the water resistance of the nitrocellulose film produced on breaking and drying of the emulsion.

11. A nitrocellulose emulsion comprising a substantially water-immiscible solution of nitrocellulose containing a pigment having a tendency to break the emulsion emulsified with water through the medium of an emulsifying agent comprising methyl cellulose and sodium lauryl sulphate, the methyl cellulose being in an amount which is sufficient to have substantial emulsifying action but less than that which is sufficient deleteriously to affect the water resistance of the nitrocellulose film produced on breaking and drying of the emulsion.

12. A nitrocellulose emulsion comprising a substantially water-immiscible solution of nitrocellulose containing a pigment having a tendency to break the emulsion emulsified in disperse phase in water containing methyl cellulose and sodium lauryl sulphate in solution, the methyl cellulose being in an amount which is sufficient to have substantial emulsifying action but less than that which is sufficient deleteriously to affect the water resistance of the nitrocellulose film produced on breaking and drying of the emulsion.

13. A nitrocellulose emulsion comprising a substantially water-immiscible solution of nitrocellulose containing zinc oxide emulsified in disperse phase in water containing methyl cellulose and a sodium salt of a half-ester sulphate of a higher aliphatic alcohol, in solution in the water, the methyl cellulose being in an amount which is sufficient to have substantial emulsifying action but less than that which is sufficient deleteriously to affect the water resistance of the nitrocellulose film produced on breaking and drying of the emulsion.

14. A nitrocellulose emulsion comprising a substantially water-immiscible solution of nitrocellulose containing zinc oxide emulsified in disperse phase in water containing methyl cellulose and sodium lauryl sulphate in solution in the water, the methyl cellulose being in an amount which is sufficient to have substantial emulsifying action but less than that which is sufficient deleteriously to affect the water resistance of the nitrocellulose film produced on breaking and drying of the emulsion.

15. A nitrocellulose emulsion comprising a substantially water-immiscible solution of nitrocellulose, having a concentration of nitrocellulose within the range 10%–40% and containing zinc oxide, emulsified in disperse phase in water containing methyl cellulose and a sodium salt of a half-ester sulphate of a higher aliphatic alcohol in solution, the ratio of nitrocellulose solution to water ranging between about 2:1 to 4:1 by weight, the methyl cellulose being in an amount which is sufficient to have substantial emulsifying action but less than that which is sufficient deleteriously to affect the water resistance of the nitrocellulose film produced on breaking and drying of the emulsion.

16. A nitrocellulose emulsion comprising a substantially water-immiscible solution of nitrocellulose, having a concentration of nitrocellulose within the range 10%–40% and containing zinc oxide, emulsified in disperse phase in water containing methyl cellulose and sodium lauryl sulphate in solution, the ratio of nitrocellulose solution to water ranging between about 2:1 to 4:1 by weight, the methyl cellulose being in an amount which is sufficient to have substantial emulsifying action but less than that which is sufficient deleteriously to affect the water resistance of the nitrocellulose film produced on breaking and drying of the emulsion.

17. A nitrocellulose emulsion containing a pigment which has a tendency to break the emulsion comprising a substantially water-immiscible solution of nitrocellulose emulsified in disperse phase in water which contains a small amount of both methyl cellulose and sodium stearyl sulphate in solution.

18. A nitrocellulose emulsion containing a pigment which has a tendency to break the emulsion comprising a substantially water-immiscible solution of nitrocellulose emulsified in disperse phase in water which contains a small amount of both methyl cellulose and sodium cetyl sulphate in solution.

MALCOLM C. MOORE.